(12) United States Patent
Scharf et al.

(10) Patent No.: US 6,968,152 B2
(45) Date of Patent: Nov. 22, 2005

(54) COMPUTER-AIDED METHOD OF TRANSMITTING TEACHING MATERIALS

(75) Inventors: Joachim Scharf, Neu Wulmstorf (DE); Stefan Gazinski, Hamburg (DE); Kirsten Wedemeyer, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 166 days.

(21) Appl. No.: 10/211,894

(22) Filed: Aug. 2, 2002

(65) Prior Publication Data

US 2003/0031997 A1 Feb. 13, 2003

(30) Foreign Application Priority Data

Aug. 7, 2001 (DE) .......................................... 101 37 923

(51) Int. Cl.[7] ................................................ G09B 5/00
(52) U.S. Cl. ........................ 434/350; 434/118; 434/322; 434/362; 706/16
(58) Field of Search ............................... 434/118, 219, 434/322, 323, 350, 362, 234; 706/16, 45, 52, 927; 707/100, 500; 382/276, 318

(56) References Cited

U.S. PATENT DOCUMENTS

| | | | | |
|---|---|---|---|---|
| 4,867,685 A | * | 9/1989 | Brush et al. ................. 434/234 |
| 5,788,504 A | * | 8/1998 | Rice et al. ................... 434/219 |
| 5,870,731 A | * | 2/1999 | Trif et al. ...................... 706/52 |
| 6,146,148 A | * | 11/2000 | Stuppy ........................ 434/322 |
| 6,178,308 B1 | * | 1/2001 | Bobrow et al. ............. 434/350 |
| 2001/0039552 A1 | * | 11/2001 | Killi et al. ................... 707/500 |
| 2002/0182578 A1 | * | 12/2002 | Rachman et al. ........... 434/350 |
| 2002/0187463 A1 | * | 12/2002 | Aspe et al. .................. 434/362 |
| 2003/0069866 A1 | * | 4/2003 | Ohno ........................... 706/16 |
| 2004/0115596 A1 | * | 6/2004 | Snyder et al. .............. 434/118 |

FOREIGN PATENT DOCUMENTS

DE  19961546  6/2001  ............ G09B/5/06

* cited by examiner

Primary Examiner—Joe H. Cheng
(74) Attorney, Agent, or Firm—Gregory L. Thorne

(57) ABSTRACT

The invention relates to a method of transmitting teaching materials by means of an electronic data network, wherein a person to be taught is first shown the teaching material on a client computer system. After the teaching material has been displayed, the person to be taught has the possibility of undergoing a test on the displayed teaching material. The invention also describes a computer network with a server computer system as well as a server computer system.

7 Claims, 3 Drawing Sheets

COMPUTER-AIDED METHOD OF TRANSMITTING TEACHING MATERIALS

Figure 1:
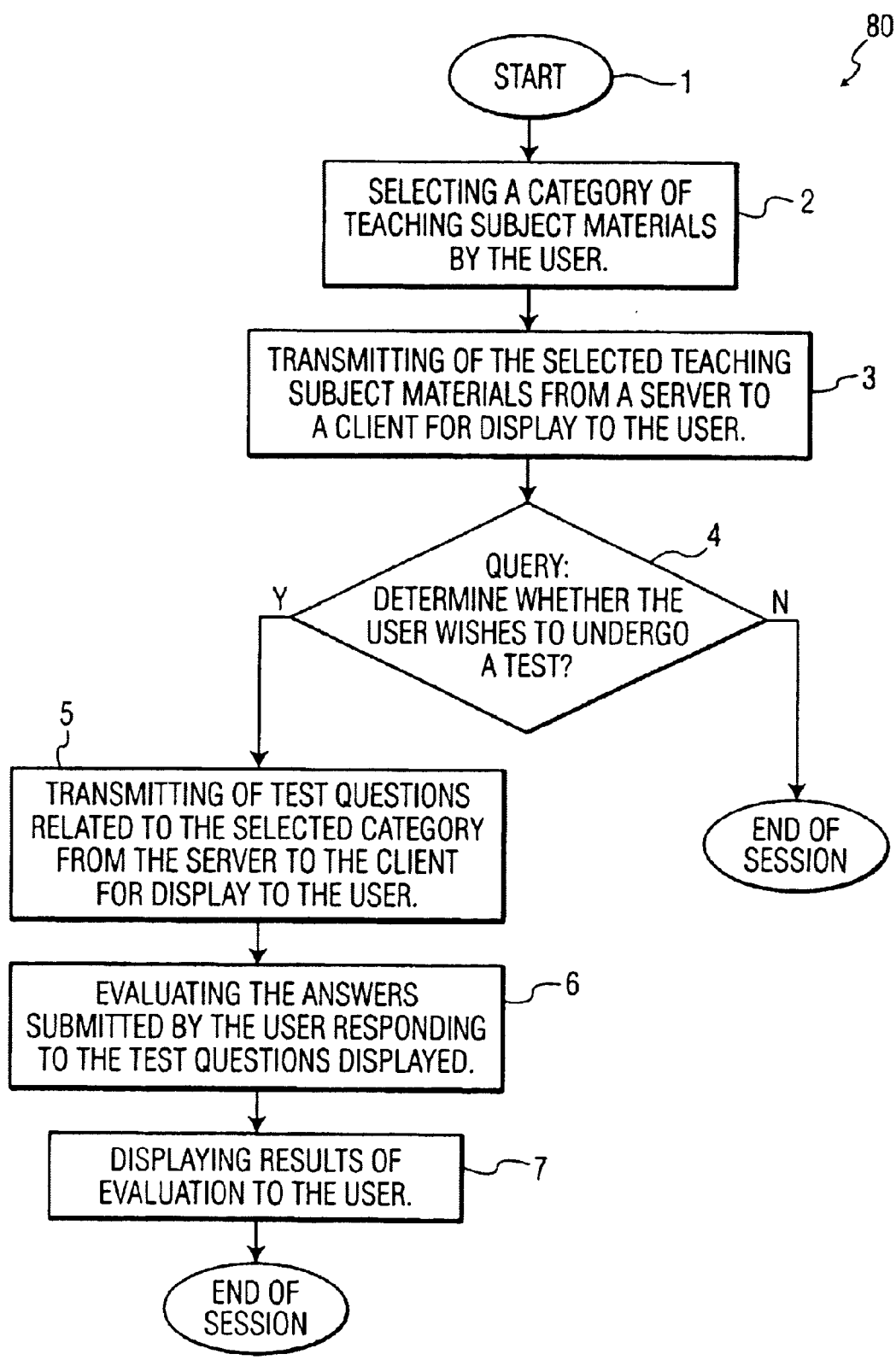

The invention relates to a method of transmitting teaching materials. The invention further relates to a computer network and to a server computer system.

A main application of computers is the exchange of information via a network. The largest computer network at this moment is the Internet. The Internet is an electronic data network with a large number of connected computers and computer networks. The connected computers can exchange data with one another by means of a service, for example the World Wide Web ("WWW").

The architecture of the WWW corresponds to the conventional client-server model. The terms "client" and "server" define the actual function of a computer. The client computer requests data whereas a server computer supplies data. Thus the WWW service enables a server computer, for example a web server, to send a graphic web page as a piece of information to a connected client computer. A web page may either be a data block or a document which is written in a hypertext language such as the Hyper Text Markup Language ("HTML") and which may contain texts, graphic displays, and multimedia objects.

Each computer and each web page of the WWW is unequivocally identifiable by means of a Uniform Resource Locator ("URL"). To indicate a given web page, the client computer specifies the URL of this page in the form of a request, for example as a Hyper Text Transfer Protocol ("HTTP") request. This request is passed on to the web server that supports this web page. Upon receiving the request, the web server sends the web page to the client computer. The client computer then displays this web page by means of a browser. A browser is a special application program which processes requests for web pages and the display of web pages.

Many web servers have been developed by now in the World Wide Web, by means of which traders and manufacturers advertise products and services and can also sell them. The product range varies from goods such as music, which are electronically supplied to the customer via the Internet, to objects (domestic appliances, computers and accessories, electronic devices) which arrive at the customer by traditional transport routes.

In contrast to the above, institutions such as schools or universities, but also companies in the field of the new media, have recourse to traditional methods for their teaching projects (passing on of information to students): learning by heart, passive classical teaching, or card index files. These are conscious, time-consuming teaching/learning methods and static systems. Static systems, however, cannot adapt themselves to the individual learning level or to special learning habits of an individual person, neither can these systems differentiate between persons.

Traditional learning/teaching methods are unsatisfactory for transmitting knowledge to individual learners in an environment which is becoming ever more complicated and acts ever more quickly. The learner requires simple, effective, and timesaving instruments for acquiring knowledge in times in which the factor time plays a decisive role in work, education, and leisure.

A method of transmitting teaching materials by computer is known, for example, from DE 199 61 546. In this method, idle periods of the computer are utilized for displaying learning items, for example vocabulary, to the user, and/or test the user in this respect.

It is an object of the invention to make available a computer-aided method of transmitting teaching materials.

This object is achieved by means of a method of transmitting teaching materials by means of an electronic data network, wherein a server computer system receives a request from a user for a teaching material via a client computer system, the server computer system sends the teaching material to the client computer system, the teaching material is displayed on the client computer system, the server computer system sends a request to the client computer system asking whether the user wants to take a test with respect to the displayed teaching material after the teaching material has been displayed on the client computer system, the user sends a reply to the server computer system via the client computer system, the server computer system sends test questions on the displayed teaching material to the client computer system if the user gave a positive answer, the test questions are displayed on the client computer system, the user sends the answers to the server computer system via the client computer system, and the server computer system receives the answers, evaluates them, and sends the result to the client computer system.

Teaching materials can be transmitted to a user by means of this method independently of time and location. The user need not necessarily be present in a given location at a given time, instead, the moment when he or she wants to be taught can be freely chosen and be adapted to the actual work load.

The user can test his or her knowledge with the present invention before taking a test as to the displayed teaching material.

The advantageous present invention enables the operator of the server computer system to give incentives to the persons to be taught for carefully studying the teaching material.

The advantageous present invention renders it possible for the operator of the server computer system to update the teaching materials to be transmitted in a simple manner.

The electronic data network advantageously defined hereinafter enables the operator of the server computer system to select which client computer system he allows to participate in the method of transmitting teaching materials.

The invention further relates to a computer system with a server computer system and to a server computer system, which are each designed for receiving a request from a user for a teaching material via a client computer system, sending the teaching material to the client computer system, sending a request to the client computer system asking whether the user wants to undergo a test as to the displayed teaching material after the teaching material was sent to the client computer system, sending test questions on the displayed teaching material to the client computer system in the case of a positive answer from the user, receiving the answers of the user via the client computer system, and evaluating the answers and sending the result to the client computer system.

Figure 2:
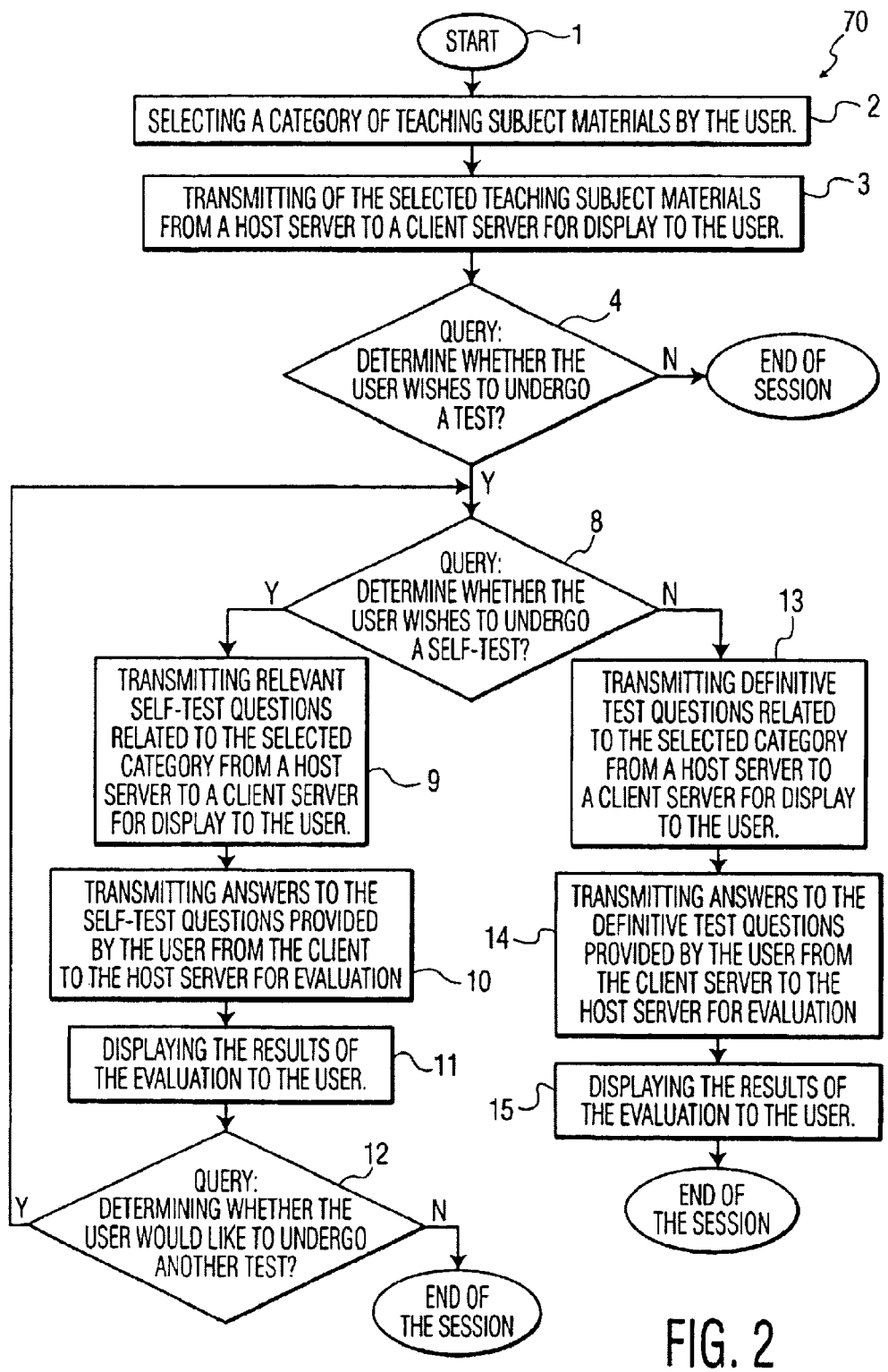
Figure 3:
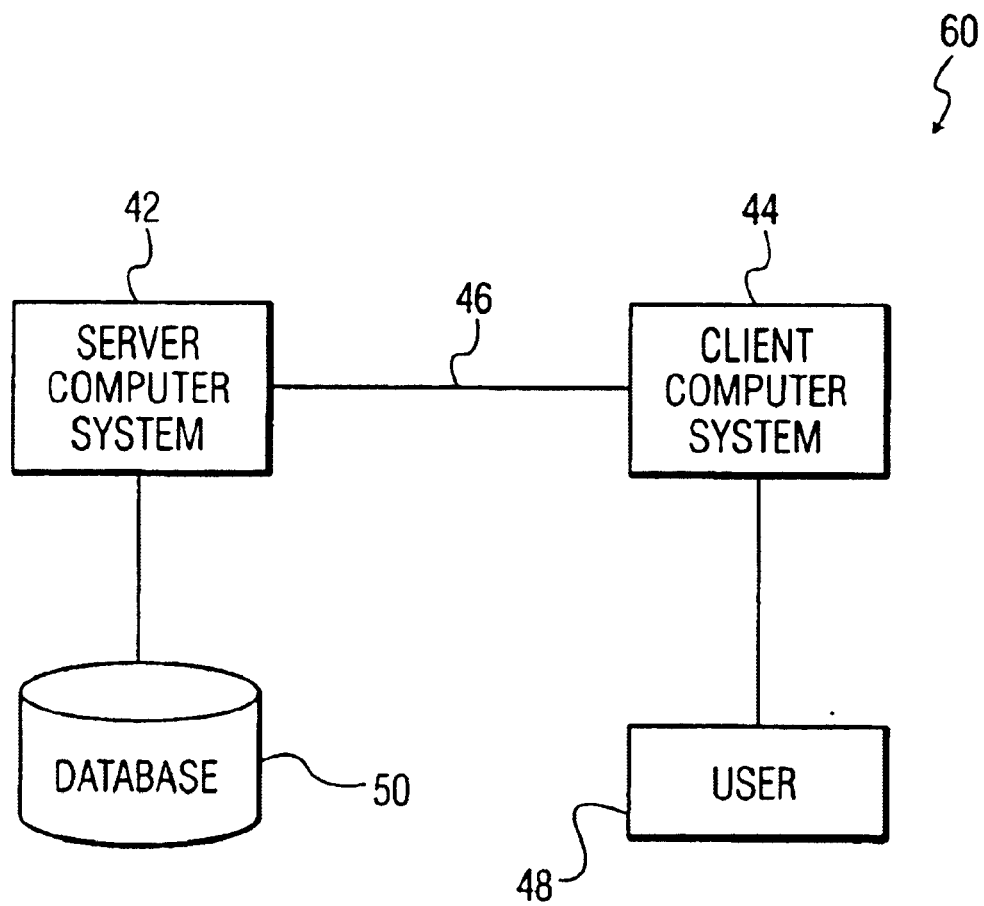

Embodiments of the invention will be explained in more detail below with reference to the drawings, in which FIG. 1 is a flowchart of an embodiment of the method according to the invention;

FIG. 2 is a flowchart representing a possible embodiment of a test procedure in the method according to the invention; and FIG. 3 is a schematic diagram of an embodiment of a system configured to carry out the method according to the invention.

The method of transmitting teaching materials preferably forms part of a learning or teaching program. With reference to FIG. 3, the method is preferably implemented by means of an electronic data network 46 in combination with a server computer system 42 and a client computer system 44. The electronic data network 46 may be, for example, the Internet, an Intranet, for example within a company, or an Extranet.

The teaching materials to be transmitted are then present in a server computer system 42 and are preferably managed in databases 50 therein. A database is a system for describing, storing, and retrieving large-scale data quantities which are used by several application programs. The server computer system 42 may be operated, for example, by a company, a university, a school, a public institution, or an academy. A user 48 may come into contact with the server computer system 42 by means of the client computer system 44. The user 48 may be, for example, a student, a schoolboy/girl, an employee of the company operating the learning or teaching program, or a trader or seller of products of the company operating the learning or teaching program. The teaching materials may comprise, for example, product information, company information, information on novel developments, and school or study materials. Preferably, the teaching materials are subdivided into a plurality of categories.

As FIG. 1 shows, the method according to the invention is first started as shown in a flowchart 80. To this end, the user causes his client computer system in the first step 1 to display a start page of the learning or teaching program. The start page may be, for example, a web page at which the user arrives via the home page of the operator of the learning or teaching program. In the next step 2, the user selects a category of teaching materials by sending a corresponding request to the server computer system via the client computer system. Each category may comprise several subcategories. In the next step 3, the teaching materials of the selected category are sent to the client computer system by the server computer system and are displayed on the client computer system of the user. The display of the teaching materials may take place, for example, in the form of web pages comprising texts, graphs, pictures, animations, games, or a combination of these means. After all teaching materials from the selected category has been displayed on the client computer system, the server computer system sends a request to the user via the client computer system in the next step 4, asking whether the person wants to undergo a test on the selected category. If the user sends a negative answer, the method is concluded for this category. Preferably, the user is shown the start page of the learning or teaching program again on his client computer system in that the server computer system sends the relevant web page to the client computer system.

If the user wants to undergo a test on the selected category of teaching materials, he will enter a test region. In the next step 5, the test questions on the selected category of teaching materials are sent by the server computer system to the client computer system and displayed there, for example in the form of web pages. The questions are preferably individually displayed. The answers to the test questions, which are sent to the server computer system, for example in the form of web pages, are evaluated by the server computer system in the next step 6. In a subsequent step 7, the result is sent by the server computer system to the client computer system and displayed to the user there. It may be advantageous here that the correct answers to the test questions are not presented to the user.

It may be advantageous to arrange the test region of the method in the manner indicated in a flowchart 70 of FIG. 2. In this embodiment, the server computer system transmits the question, in the step 4, whether the user wants to undergo a test on the displayed category of teaching materials after the teaching materials of the selected category were displayed on the client computer system. If the user sends an affirmative answer to the server computer system, the server computer system in the next step 8 sends a second question as to whether the user would like to perform a self-test first. If the user replies in the negative to the server computer system, the definitive test questions, for example in the form of web pages, are sent to the client computer system by the server computer system in the next step 13 and displayed on the client computer system. In the next step 14, the answers of the user are sent to the server computer system by the client computer system, for example in the form of web pages, and are evaluated in the server computer system. In the next step 15, the server computer system sends the result, for example in the form of a web page, to the client computer system. It may be advantageous that the user has only one possibility for taking a final test for each category of teaching materials.

If the user would like to perform a self-test first, however, the server computer system in a next step 9 will send the relevant self-test questions, for example in the form of web pages, to the client computer system, where they are displayed. In the next step 10, the answers of the user, for example in the form of web pages, are sent to the server computer system, are evaluated by the server computer system, and the result is sent to the client computer system in the subsequent step 11. In a next step 12, the server computer system sends a further request, for example in the form of a web page, asking whether the user would like to undergo a further test. If the user sends a negative answer to the server computer system, the method is ended for this category of teaching materials. Preferably, the user is shown the start page of the learning or teaching program again on his client computer system. It may be preferred that, when the user answers a self-test question incorrectly, the server computer system sends the correct answer, for example in the form of a web page, to the client computer system.

If the user wants to undergo a further test, he will again be asked whether he wants to perform a self-test. If he wants to perform a further self-test, the routine described above for the self-test as represented by steps 9 through 12 is performed again. If the user does not want a self-test, but the definitive test, the routine for the test described above as represented by steps 13 through 15 is followed.

The questions of the self-test or the definitive test may be put, for example, in the multiple choice form.

It may be preferred that the operator limits the participation in the learning or teaching program. In this embodiment, the server computer system sends a web page asking for an access authorization to the client computer system in a phase of the learning or teaching program. The user then enters an access code, for example a password, given to him by the operator of the server computer system. The question as to the access authorization may be put, for example, immediately after the start of the learning or teaching program or before the final test can be made.

If the user cannot provide an access code, the server computer system in a further step sends a web page with a registration form. If the user wants to register, he will enter his data in the registration form and send it to the server computer system via the client computer system. After the entries have been positively adjudged by the operator of the server computer system, the access code is transmitted to the user, for example by post or by Internet. Alternatively, the user may himself choose a password. It is also possible for the user to send a request for a registration form to the server computer system, whereupon the server computer system sends the web page with the registration form.

The method of transmitting teaching materials according to the invention in particular offers companies the possibility of training its employees or the vendors of its products, for example TV sets, monitors, DVD players, CD recorders, shavers, domestic appliances, etc. Thus the company, for example an electronics company, may offer a training program on the products of the company on its home page that is marketing-oriented. This offers the company a possibility of training vendors and assistants for sales purposes. To give the persons to be taught an incentive to study the teaching materials carefully, it may be advantageous that the server computer system assigns a certain number of points to each answered test question in dependence on the answer of the user. Thus the user can obtain a certain number of points for each correctly answered test question. The user, who can preferably undergo a final test in a category only once, can collect the points and convert them into a premium, for example a product of the company operating the training program. The individual test questions may be assigned different numbers of points in dependence on the degree of difficulty. The user has the possibility to call up his points score on a web page. On a further web page, the user has an opportunity of inspecting which premiums are awarded for a certain number of points.

It may be advantageous that a user is given an opportunity of taking a renewed final test in a given category of teaching materials after this category has been updated by the operator of the learning or teaching program.

What is claimed is:

1. A method for transmitting teaching material via an electronic data network from a server computer system to a client computer system operated by associated users, respectively, said method comprising the steps of:

receiving via said server computer system a request from a user for displaying teaching material on said user's associated client computer system;

transmitting via the server computer system, in response to said request, said teaching material to the client computer system;

displaying said teaching material to the user via the client computer system;

transmitting via the server computer system a request to the client computer system to determine whether the user chooses to take a test comprising a plurality of test questions corresponding to said teaching material based upon the user's prior viewing of the displayed teaching material;

receiving via the server computer system from the user a reply to take the test;

transmitting, in response to the reply, the test to the client computer system;

administering via the client computer system the test to the user;

receiving via the server computer system a test response comprising a plurality of test answers corresponding to the administered test from the user;

evaluating via the server computer system the test response; and transmitting results of the evaluation of the test response to the client computer system for display to the user.

2. The method of claim 1 wherein the test is selected from the group consisting of a self-test and a definitive test.

3. The method of claim 1 wherein the result comprises a point value corresponding to a number of correct test answers in the test response.

4. The method of claim 1 further comprising the step of managing the teaching material in a database electronically connected to the server computer system.

5. The method of claim 1 wherein the electronic data network is selected from the group consisting of the Internet, an Extranet, an Intranet and combinations thereof.

6. A computer network comprising:

a server computer system;

a client computer system adapted for electronic communication with said server computer system via an electronic data network; and said server computer system being programmed for implementing the steps of:

receiving a request from a user for displaying teaching material on said user's associated client computer system;

transmitting in response to said request, said teaching material to the client computer system;

displaying said teaching material to the user via the client computer system;

transmitting a request to the client computer system to determine whether the user chooses to take a test comprising a plurality of test questions corresponding to said teaching material based upon the user's prior viewing of the displayed teaching material;

receiving from the user a reply to take the test;

transmitting, in response to the reply, the test to the client computer system;

administering via the client computer system the test to the user;

receiving a test response comprising a plurality of test answers corresponding to the administered test from the user;

evaluating the test response; and transmitting results of the evaluation of the test response to the client computer system for display to the user.

7. A server computer system in electronic communication with a client computer system operated by associated users, respectively, said server computer system programmed for implementing the steps of:

receiving a request from a user for displaying a teaching material on said user's associated client computer system;

transmitting, in response to said request, said teaching material to the client computer system;

transmitting a request to the client computer system to determine whether the user chooses to take a test comprising a plurality of test questions corresponding to said teaching material;

receiving a reply from the user to take the test;

transmitting, in response to the reply, the test to the client computer system;

receiving a test response comprising a plurality of test answers corresponding to the administered test from the user;

evaluating the test response; and transmitting results of the evaluation of the test response to the client computer system for display to the user.

* * * * *